(12) United States Patent
Spears

(10) Patent No.: US 7,783,791 B2
(45) Date of Patent: Aug. 24, 2010

(54) APPARATUS AND METHOD FOR TREATING ADDRESSES IN AN ENVIRONMENTAL CONTROL NETWORK

(75) Inventor: Stephen Spears, Carrollton, TX (US)

(73) Assignee: Lennox Manufacturing, Inc., Richardson, TX (US)

( * ) Notice: Subject to any disclaimer, the term of this patent is extended or adjusted under 35 U.S.C. 154(b) by 627 days.

(21) Appl. No.: 11/674,308

(22) Filed: Feb. 13, 2007

(65) Prior Publication Data

US 2008/0192745 A1 Aug. 14, 2008

(51) Int. Cl.
 *G06F 3/00* (2006.01)
(52) U.S. Cl. .................. 710/9; 710/2; 710/3
(58) Field of Classification Search .......... 710/9, 710/2, 3
 See application file for complete search history.

(56) References Cited

U.S. PATENT DOCUMENTS

| | | | |
|---|---|---|---|
| 4,497,031 A | 1/1985 | Froehling et al. | |
| 4,616,325 A | 10/1986 | Heckenbach et al. | |
| 5,095,453 A | 3/1992 | Pierson et al. | |
| 5,384,697 A | 1/1995 | Pascucci | |
| 5,511,188 A | 4/1996 | Pascucci et al. | |
| 5,522,044 A | 5/1996 | Pascucci et al. | |
| 5,550,980 A | 8/1996 | Pascucci et al. | |
| 5,598,566 A | 1/1997 | Pascucci et al. | |
| 5,884,072 A | 3/1999 | Rasmussen | |
| 6,029,092 A | 2/2000 | Stein | |
| 6,115,713 A | 9/2000 | Pascucci et al. | |
| 6,405,103 B1 | 6/2002 | Ryan et al. | |
| 6,736,328 B1 | 5/2004 | Takusagawa | |
| 6,868,292 B2 | 3/2005 | Ficco et al. | |
| 7,076,961 B2 | 7/2006 | Takusagawa | |
| 7,130,719 B2 | 10/2006 | Ehlers et al. | |
| 7,148,796 B2 | 12/2006 | Joy et al. | |
| 7,155,507 B2 | 12/2006 | Hirano et al. | |
| 2003/0041205 A1* | 2/2003 | Wu et al. .................. | 710/302 |
| 2004/0208184 A1* | 10/2004 | Tanaka et al. ............ | 370/397 |

\* cited by examiner

*Primary Examiner*—Niketa I Patel
*Assistant Examiner*—Zachary K Huson

(57) ABSTRACT

An apparatus for treating addresses employed in an environmental control network that involves at least one control unit communicating with a plurality of components, each respective component of the plurality of components having an address selected from a predetermined number of address values, includes: an address extending unit coupled with the at least one control unit and with at least one coupled component of the plurality of components. The address extending unit treats each address for each coupled component to establish a respective unique treated address for each coupled component. The at least one control unit identifies each respective component by the respective treated address.

20 Claims, 4 Drawing Sheets

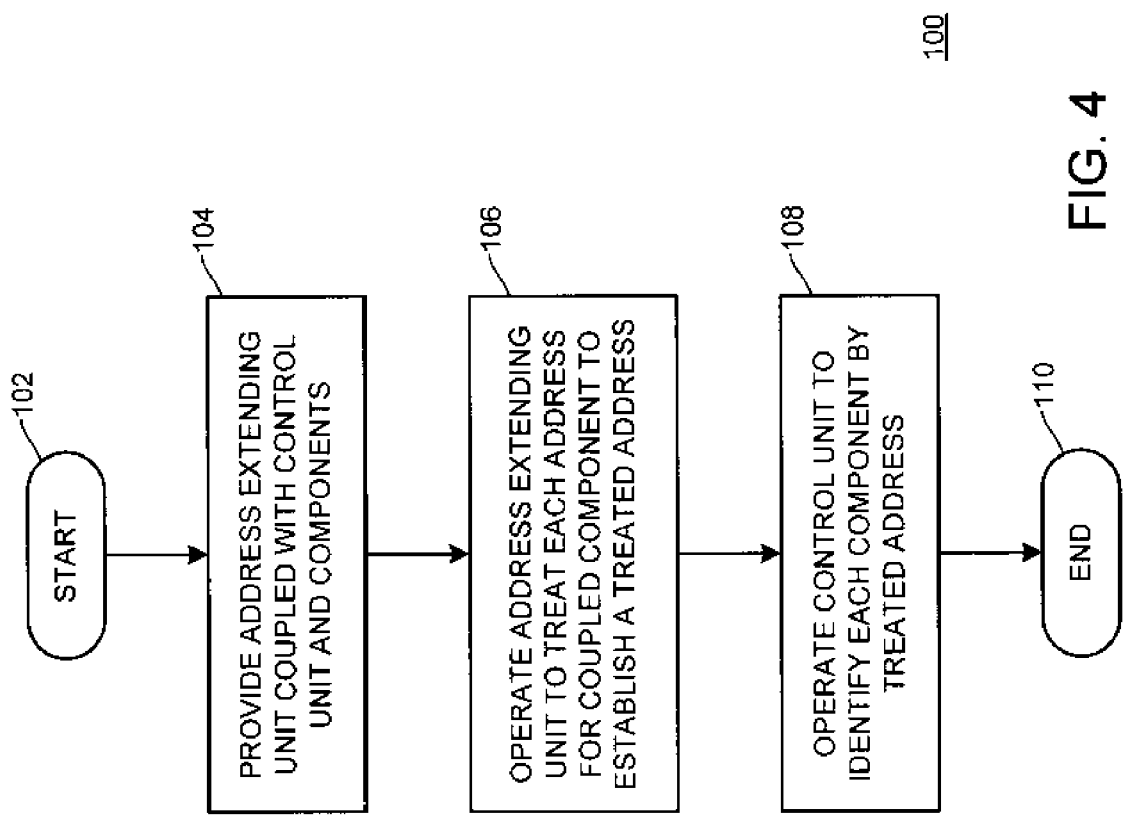

APPARATUS AND METHOD FOR TREATING ADDRESSES IN AN ENVIRONMENTAL CONTROL NETWORK

BACKGROUND OF THE INVENTION

The present invention is directed to network communication arrangements, and especially to network communication addressing arrangements in environmental control systems.

Network designs may be limited to a predetermined number of addresses for communication with various network stations. By way of example and not by way of limitation, an environmental control or environmental conditioning system may be limited to a predetermined number of addresses for addressing conditioning elements (e.g., heating and air conditioning units), temperature sensor units, and other units useful in operating an environmental control system.

There may be applications for which it is desirable to employ a greater number of communication nodes or stations than may be addressed by the predetermined number of addresses. By way of example and not by way of limitation, large systems using a large number of networked conditioning elements may require more addresses than provided by the predetermined number of addresses for proper implementation. By way of further example and not by way of limitation, adding sensors such as temperature sensors, relative humidity sensors, carbon dioxide ($CO_2$) sensors or other devices with which communications may be effected when using the network can also establish a need for a greater number of addresses than the predetermined number of addresses provided by a system.

There is a need for an apparatus and method for treating addresses in an environmental control network that avails a network system of an increased number of addresses than initially provided for the system.

SUMMARY OF THE INVENTION

An apparatus for treating addresses employed in an environmental control network that involves at least one control unit communicating with a plurality of components, each respective component of the plurality of components having an address selected from a predetermined number of address values, includes: an address extending unit coupled with the at least one control unit and with at least one coupled component of the plurality of components. The address extending unit treats each address for each coupled component to establish a respective unique treated address for each coupled component. The at least one control unit identifies each respective component by the respective treated address.

A method for treating addresses employed in an environmental control network that includes at least one control unit communicating with a plurality of components, each respective component of the plurality of components having an address selected from a predetermined number of address values, includes the steps of: (a) Providing an address extending unit coupled with the at least one control unit and with at least one coupled component of the plurality of components. (b) Operating the address extending unit to treat each address for each coupled component to establish a respective unique treated address for each coupled component. (c) Operating the at least one control unit to identify each respective component by the respective treated address.

It is, therefore, a feature of the present invention to provide an apparatus and method for treating addresses in an environmental control network that avails a network system of an increased number of addresses than initially provided by the system.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 4 is a flow chart illustrating the method of the present invention.

DETAILED DESCRIPTION OF THE PREFERRED EMBODIMENT

Figure 1:
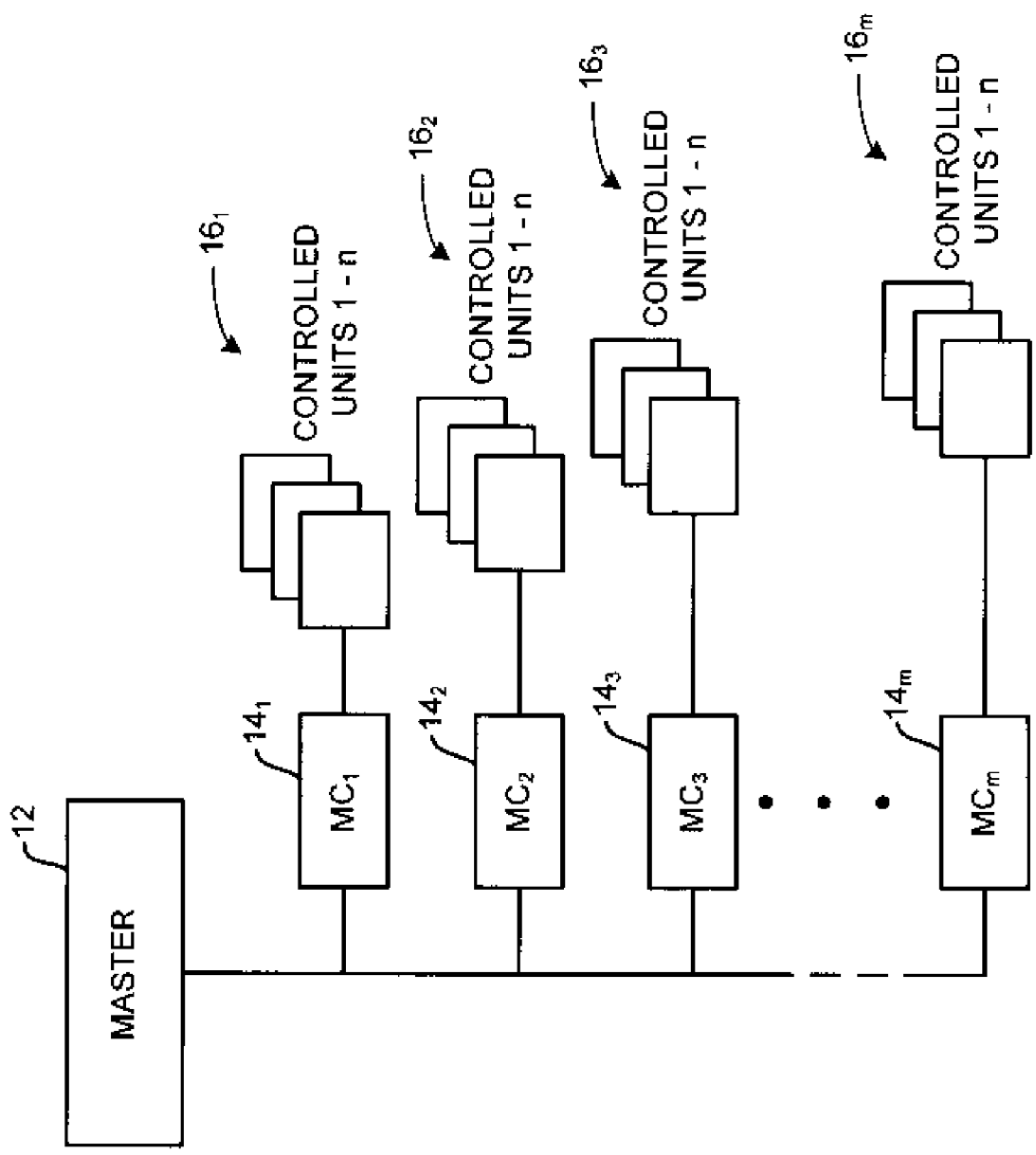
FIG. 1 is a schematic diagram of an addressing arrangement in a prior art environmental control network.

FIG. 1 is a schematic diagram of an addressing arrangement in a prior art environmental control network. In FIG. 1, an environmental control network 10 includes a master control unit 12 coupled with modular control (MC) units $14_1$ ($MC_1$), $14_2$ ($MC_2$), $14_3$ ($MC_3$), $14_n$ ($MC_m$). The indicator "m" is employed to signify that there can be any number of modular control units in environmental control network 10. The inclusion of four modular control units $14_1$, $14_2$, $14_3$, $14_m$ in FIG. 1 is illustrative only and does not constitute any limitation regarding the number of modular control units that may be included an environmental control network, except in so far as addresses are limited to a predetermined number of addresses as will be described hereinafter.

Each respective MC unit $14_m$ is coupled with and controls operation of a network of communicating units in response to master control unit 12. MC unit $14_1$ responds to master control unit 12 for controlling operation of a first network $16_1$ of communicating units. First network $16_1$ of communicating units may include a plurality of communicating units, indicated by an annotation 1-n in FIG. 1. MC unit $14_2$ responds to master control unit 12 for controlling operation of a second network $16_2$ of communicating units. Second network $16_2$ of communicating units may include a plurality of communicating units, indicated by an annotation 1-n in FIG. 1. MC unit $14_3$ responds to master control unit 12 for controlling operation of a third network $16_3$ of communicating units. Third network $16_3$ of communicating units may include a plurality of communicating units, indicated by an annotation 1-n in FIG. 1. MC unit $14_m$ responds to master control unit 12 for controlling operation of an mth network $16_m$ of communicating units. The mth network $16_m$ of communicating units may include a plurality of communicating units, indicated by an annotation 1-n in FIG. 1.

In prior art network 10, units within network 10 may be configured in a manner that limits the number of available addresses to a predetermined number. By way of example and not by way of limitation, an address for an individual unit may be established by positioning of switch elements of a Dual In-line Package (DIP) switch (sometimes referred to as a Dual In-line Programming switch). By way of example and not by way of limitation, a 5-switch DIP switch unit may provide two-positions for each of five switches. Using such a 5-switch DIP switch unit one may have available up to 32 addresses ($2^5$ addresses). If one chooses not to use a "0" address, then the limit of available addresses is 31 addresses.

Using a predetermined limit of 31 addresses as an example, environmental control network 10 may have a maximum of 31 units in its entirety. That is, addresses in such a system would be available to uniquely identify only 31 total individual network units including master control unit 12, modular control units $14_m$ and any of units 1-n of each respective network of communicating units $16_m$.

Redesigning network units to accommodate a greater number of addresses (e.g., by installing larger DIP switches) may be a costly endeavor which may involve personnel time, product testing, marketing, standards testing (e.g., United Laboratories—UL—approval) and other occasions for cost and delay. An apparatus and method that can significantly increase the number of addresses that may be accommodated and used by a network with little if any required redesign can be of significant value to a manufacturer of network units.

Figure 2:
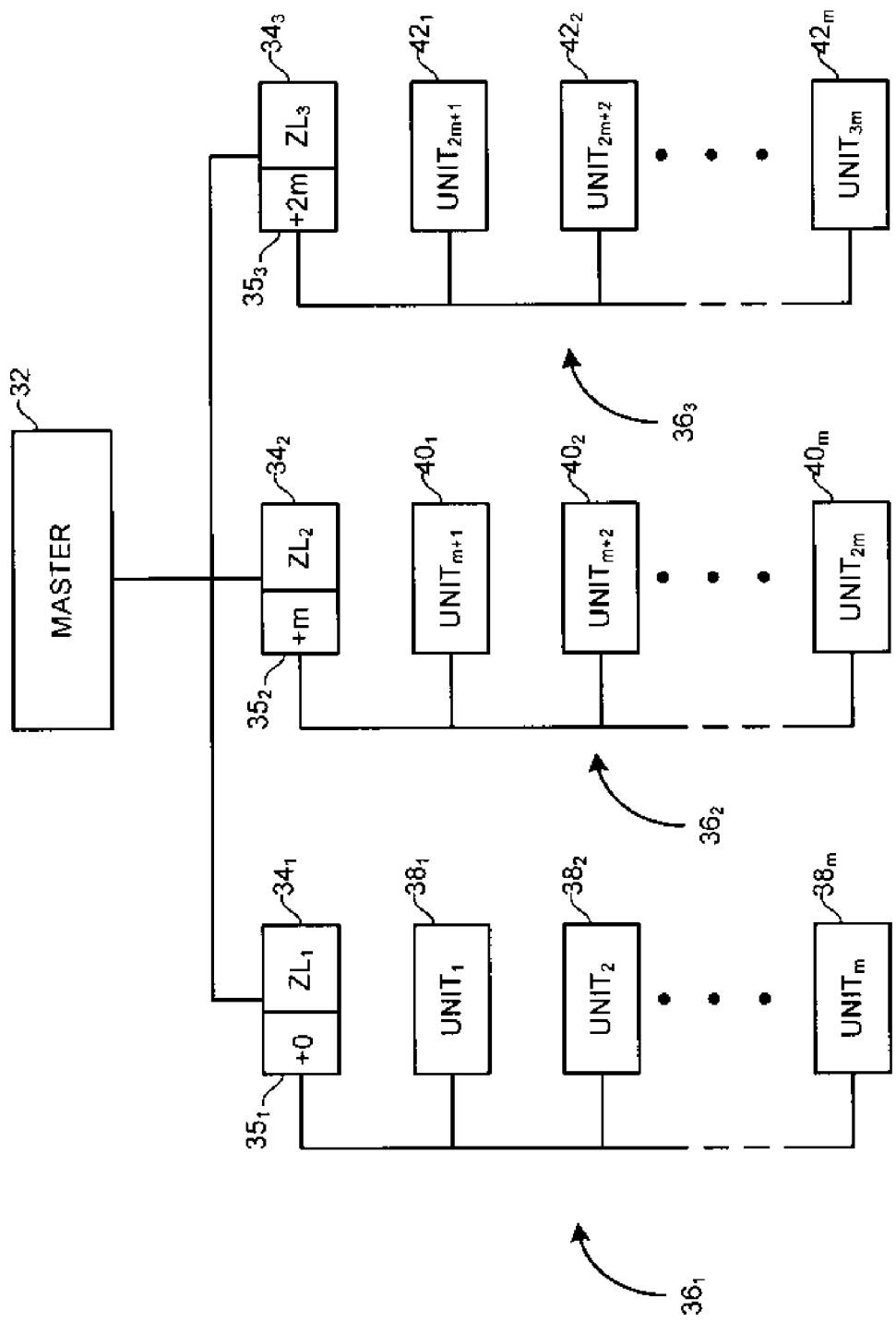
FIG. 2 is a schematic diagram illustrating employment of the present invention to effect expansion of an environmental control network.

FIG. 2 is a schematic diagram illustrating employment of the present invention to effect expansion of an environmental control network. In FIG. 2, an environmental control network 30 includes a master control unit 32 coupled with zone link (ZL) units $31_1$ ($ZL_1$), $34_2$ ($ZL_2$), $34_3$ ($ZL_3$). The inclusion of three zone link units $34_1$, $34_2$, $34_3$ in FIG. 2 is illustrative only and does not constitute any limitation regarding the number of zone link units that may be included in the environmental control network of the present invention, except in so far as physical limits impair operation with increased addressed units. Such physical limits may include, by way of example and not by way of limitation, electrical voltage or current required for operating more than a particular number of units, latency in addressing an individual unit when more than a particular number of other units must be addressed as well, and other physical limitations regarding size of a network that are known to network designers.

Each zone link unit $34_1$, $34_2$, $34_3$ includes a respective address treating unit $35_1$, $35_2$, $35_3$ for treating addresses of communicating units associated with each network $36_1$, $36_2$, $36_3$ of communicating units. Treatment of an address may be effected by any altering of an address to establish an extended or treated address for a communicating unit. One fashion of such treatment may involve, by way of example and not by way of limitation, mathematical manipulation of an address, such as by multiplying an address by a factor, by adding a value or term to an address or by otherwise mathematically affecting an address. Another fashion of such treatment may involve, by way of further example and not by way of limitation, signal manipulation of an address such as by altering sign or polarity of an address, assigning a predetermined signal level (e.g., in a tri-level signaling scheme) to an address or by otherwise effecting signal manipulation of an address.

Zone link unit $34_1$ is coupled with and controls operation of a network $36_1$ of communicating units $38_1$, $38_2$, $38_m$ in response to master control unit 32. Zone link unit $34_2$ is coupled with and controls operation of a network $36_2$ of communicating units $40_1$, $40_2$, $40_m$ in response to master control unit 32. Zone link unit $34_3$ is coupled with and controls operation of a network 363 of communicating units $42_1$, $42_2$, $42_m$ in response to master control unit 32. The indicator "m" is employed to signify that there can be any number of communicating units $38_m$, $40_m$, $42_m$ in each network $36_1$, $36_2$, $36_3$. The inclusion of three communicating units in FIG. 2 is illustrative only and does not constitute any limitation regarding the number of communicating units that may be included in the environmental control network of the present invention. The indicator "m" used in FIG. 2 has no relation with the indicator "m" used in FIG. 1.

Network 30 employs mathematical manipulation of addresses by address treating units $35_1$, $35_2$, $35_3$ in zone link units $34_1$, $34_2$, $34_3$ for treating addresses. In particular, network 30 employs address treating units $35_1$, $35_2$, $35_3$ in zone link units $34_1$, $34_2$, $34_3$ for adding a value to addresses. The value added is preferably a value associated with the maximum number of addresses available for assignment in network 30. That is, by way of example and not by way of limitation, if network 30 is limited to m addresses, it is desired that a factor "0" be added to each respective address by address treating unit $35_1$ to units in network $36_1$ of communicating units $38_1$, $38_2$, $38_m$. Treated addresses for communicating units $38_1$, $38_2$, $38_m$ are thus presented as 1, 2, m, as indicated in FIG. 2. It is desired that a factor m be added to each respective address by address treating unit $35_2$ to units in network $36_2$ of communicating units $40_1$, $40_2$, $40_m$. Treated addresses for communicating units $40_1$, $40_2$, $40_m$ are thus presented as m+1, m+2, 2m, as indicated in FIG. 2. It is desired that a factor 2m be added to each respective address by address treating unit $35_3$ to units in network $36_3$ of communicating units $42_1$, $42_2$, $42_m$. Treated addresses for communicating units $42_1$, $42_2$, $42_m$ are thus presented as 2m+1, 2m+2, 3m, as indicated in FIG. 2.

By way of example and not by way of limitation, as described earlier herein an address for an individual unit may be established by positioning of switch elements of a Dual In-line Package (DIP) switch (opting not to employ a "0" address) thereby establishing a limit of available addresses as 31 addresses. In such an exemplary network, one may assign m a value less than or equal to 31. It is not required that an equal number of communicating units $38_m$, $40_m$, $42_m$ be included in each network $36_1$, $36_2$, $36_3$. Theoretically there is no limitation regarding the number of zone link units that may be included in the environmental control network of the present invention, and thus no theoretical limit to the expansion of addresses for presentation as treated addresses. However, physical limits may likely impair operation with too great a number of addressed units. Such physical limits may include, by way of example and not by way of limitation, electrical voltage or current required for operating more than a particular number of units, latency in addressing an individual unit when more than a particular number of other units must be addressed as well, and other physical limitations regarding size of a network that are known to network designers.

Figure 3:
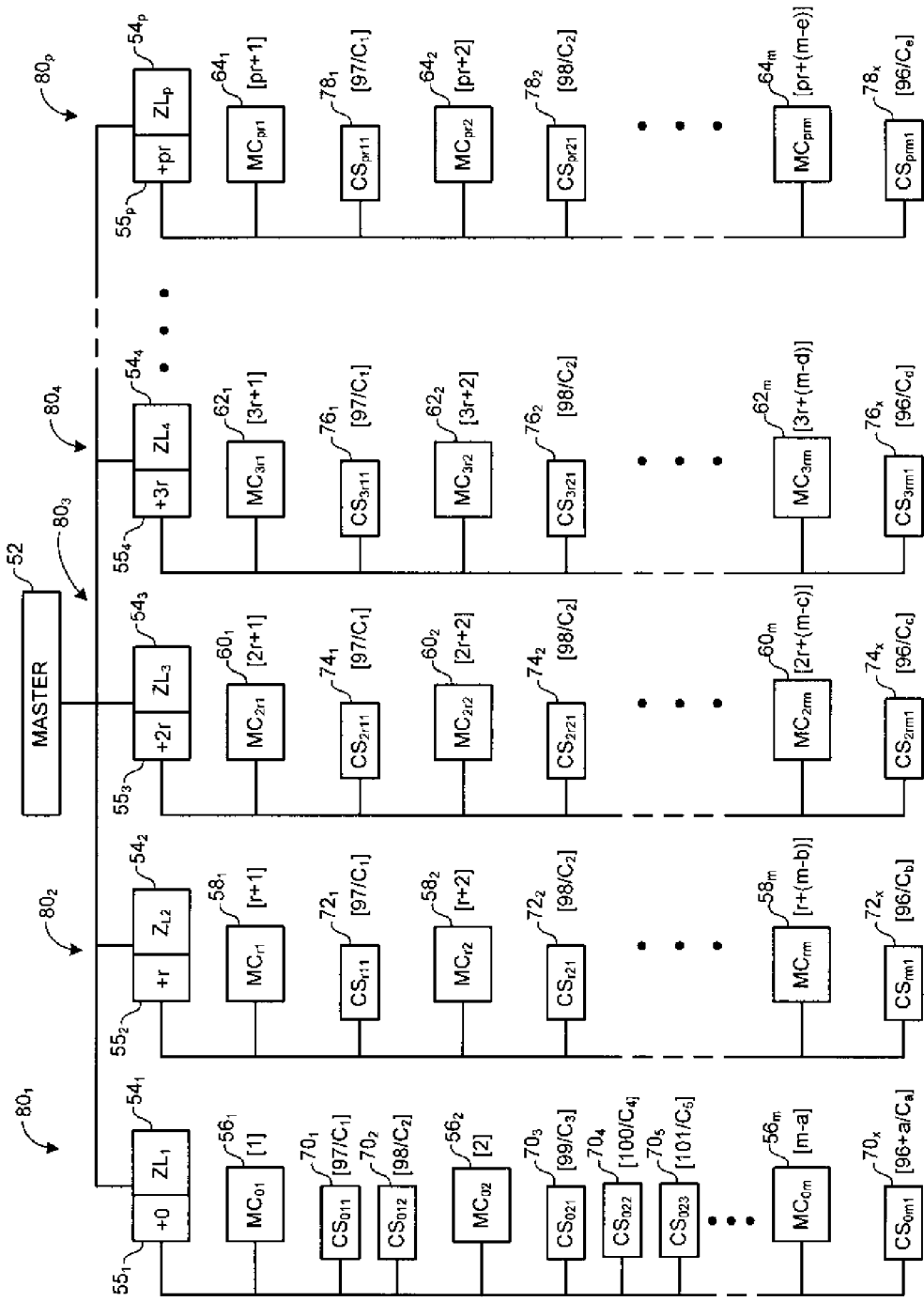
FIG. 3 is a schematic diagram illustrating employment of the present invention to effect a zoned environmental control network.

FIG. 3 is a schematic diagram illustrating employment of the present invention to effect a zoned environmental control network. In FIG. 3, an environmental control network 50 includes a master control unit 52 coupled with zone link (ZL) units $54_1$ ($ZL_1$), $54_2$ ($ZL_2$), $54_3$ ($ZL_3$), $54_4$ ($ZL_4$), $54_p$ ($ZL_p$). The indicator "p" is employed to signify that there can be any number of zone links in network 50. The inclusion of five zone link units $54_1$, $54_2$, $54_3$, $54_4$, $54_p$ in FIG. 2 is illustrative only and does not constitute any limitation regarding the number of zone link units that may be included in the environmental control network of the present invention, except in so far as physical limits impair operation with increased addressed units. Such physical limits may include, by way of example and not by way of limitation, electrical voltage or current required for operating more than a particular number of units, latency in addressing an individual unit when more than a particular number of other units must be addressed as well, and other physical limitations regarding size of a network that are known to network designers.

Each zone link unit $54_1$, $54_2$, $54_3$, $54_4$, $54_p$ includes a respective address treating unit $55_1$, $55_2$, $55_3$, $55_4$, $55_p$ for treating addresses of communicating units associated with a respective network $80_1$, $80_2$, $80_3$, $80_4$, $80_p$ of communicating units. Treatment of an address may be effected by any altering of an address to establish an extended or treated address for a communicating unit. One fashion of such treatment may involve, by way of example and not by way of limitation, mathematical manipulation of an address, such as by multiplying an address by a factor, by adding a value or term to an address or by otherwise mathematically affecting an address. Another fashion of such treatment may involve, by way of further example and not by way of limitation, signal manipulation of an address such as by altering sign or polarity of an address, assigning a predetermined signal level (e.g., in a tri-level signaling scheme) to an address or by otherwise effecting signal manipulation of an address.

Zone link unit $54_1$ is coupled with and controls operation of a network $80_1$ of communicating units. Communicating units coupled in network $80_1$ include modular control units $56_1$, $56_2$, $56_m$ and include comfort sensors $70_1$, $70_2$, $70_3$, $70_4$, $70_5$, $70_x$. By way of example and not by way of limitation, each modular control unit $56_1$, $56_2$, $56_m$ may be coupled and configured for controlling environmental conditioning of a respective region, zone or space. By way of further example and not by way of limitation comfort sensors $70_1$, $70_2$, $70_3$, $70_4$, $70_5$, $70_x$ may be coupled and configured for sensing respective parameters associated with respective regions, zones or spaces. The indicator "m" is employed to signify that there can be any number of modular control units $56_1$, $56_2$, $56_m$ in a network $80_1$, $80_2$, $80_3$, $80_4$, $80_p$ of communicating units. The inclusion of any particular number of modular control units in a network of communicating units in FIG. 3 is illustrative only and does not constitute any limitation regarding the number of modular control units that may be included in any network $80_1$, $80_2$, $80_3$, $80_4$, $80_p$ of communicating units of the present invention. The indicator "m" used in FIG. 3 has no relation with the indicator "m" used in FIGS. 1 and 2.

Network 50 is configured with comfort sensors $70_1$, $70_2$ coupled for sensing parameters within a zone controlled by modular control unit $56_1$; with comfort sensors $70_3$, $70_4$, $70_5$ coupled for sensing parameters within a zone controlled by modular control unit $56_2$; and with comfort sensor $70_x$ coupled for sensing parameters within a zone controlled by modular control unit $56_m$. Addresses for various communicating units in network $80_1$ are indicated in brackets adjacent to respective communicating units. Address treating unit $55_1$ mathematically treats addresses by adding a value "0" to addresses of communicating units in network $80_1$. Thus, modular control unit $56_1$ may have an address "1", modular control unit $56_2$ may have an address "2" and modular control unit $56_m$ may have an address "m-a". The term "a" is related to addresses assigned to comfort sensor units in network $80_1$. Comfort sensors may be assigned addresses outside the range of addresses available for assignment to modular control units $54_1$, $54_2$, $54_3$, $54_4$, $54_p$ and modular control units $56_m$, $58_m$, $60_m$, $62_m$, $64_m$. Network 50 may be designed to avail master control unit 52 with an ability to recognize addresses outside the range of addresses provided for assignment to modular control units $54_1$, $54_2$, $54_3$, $54_4$, $54_p$ and modular control units $56_m$, $58_m$, $60_m$, $62_m$, $64_m$. This may occur, by way of example and not by way of limitation, when addresses available for assignment to modular control units $54_1$, $54_2$, $54_3$, $54_4$, $54_p$ and modular control units $56_m$, $58_m$, $60_m$, $62_m$, $64_m$ are established by programming a DIP switch coding, while addresses recognizable by master control unit 52 may be established by a software program. In such a configuration, the set of addresses recognizable by master control unit 52 may exceed and may include the set of addresses programmable by DIP switches. It is such an arrangement that is accommodated by network 50 (FIG. 3). Addresses assigned to comfort sensor units $70_x$, $72_x$, $74_x$, $76_x$, $78_x$ may be independent of addresses programmed for modular control units $56_m$, $58_m$, $60_m$, $62_m$, $64_m$. In such an arrangement, master control unit 52 may separately account for associations among comfort sensor unit and modular control units.

By way of example and not by way of limitation, comfort sensor $70_1$ may have an address $C_1$, which may be recognized by master control unit 52 as being associated with modular control unit $56_1$. An example of how addressing for comfort sensors may be carried out in a human user-friendly approach may be, by way of example and not by way of limitation, to assign address $C_1$ as HEX 60+1, which is decimal 96+1. Thus address $C_1$ could be recognizable by a human user as 97 (i.e., 96+1). Other C-type addresses could similarly be straightforwardly translated by a human operator.

In similar manner, comfort sensor $70_1$ may have an address $C_1$, which may be recognized by master control unit 52 as being associated with modular control unit $56_1$. Comfort sensor $70_3$ may have an address $C_3$, which may be recognized by master control unit 52 as being associated with modular control unit $56_2$. Comfort sensor $70_4$ may have an address $C_4$, which may be recognized by master control unit 52 as being associated with modular control unit $56_2$. Comfort sensor $70_5$ may have an address $C_5$, which may be recognized by master control unit 52 as being associated with modular control unit $56_2$. Comfort sensor $70_x$ may have an address $C_a (C_a=96+a)$ which may be recognized by master control unit 52 as being associated with modular control unit $56_m$. Hence, in exemplary network 50 the address for modular control unit $56_m$ may be expressed as [m-a].

Zone link unit $54_2$ is coupled with and controls operation of a network $80_2$ Of communicating units. Communicating units coupled in network $80_2$ include modular control units $58_1$, $58_2$, $58_m$ and include comfort sensors $72_1$, $72_2$, $72_x$. By way of example and not by way of limitation, each modular control unit $58_1$, $58_2$, $58_m$ may be coupled and configured for controlling environmental conditioning of a respective region, zone or space. By way of further example and not by way of limitation comfort sensors $72_1$, $72_2$, $72_x$ may be coupled and configured for sensing respective parameters associated with respective regions, zones or spaces. Network 50 is configured with comfort sensor $72_1$ coupled for sensing parameters within a zone controlled by modular control unit $58_1$; with comfort sensor $72_2$ coupled for sensing parameters within a zone controlled by modular control unit $58_2$; and with comfort sensor $72_x$ coupled for sensing parameters within a zone controlled by modular control unit $58_m$. Addresses for various communicating units in network $80_2$ are indicated in brackets adjacent to respective communicating units. Address treating unit $55_2$ mathematically treats addresses by adding a value "r" to addresses of communicating units in network $80_2$. Thus, modular control unit $58_1$ may have an address "r+1", modular control unit $58_2$ may have an address "r+2" and modular control unit $58_m$ may have an address "r+(m-b)". The term "b" is related to addresses assigned to comfort sensor units in network $80_2$. As described earlier herein, comfort sensors are assigned addresses outside the range of addresses available for assignment to modular control units $54_1$, $54_2$, $54_3$, $54_4$, $54_p$ and modular control units $56_m$, $58_m$, $60_m$, $62_m$, $64_m$. Network 50 may be designed to avail master control unit 52 with an ability to recognize addresses outside the range of addresses provided for assignment to modular control units $54_1$, $54_2$, $54_3$, $54_4$, $54_p$ and modular control units $56_m$, $58_m$, $60_m$, $62_m$, $64_m$. It is such an arrangement that is accommodated by network 50 (FIG. 3).

By way of example and not by way of limitation, comfort sensor $72_1$ may have an address $C_1$, which may be recognized by master control unit 52 as being associated with modular control unit $58_1$. Address $C_1$ for comfort sensor $72_1$ is distinguishable by master control unit 52 from address $C_1$ for comfort sensor $70_1$ because master control unit 52 can recognize that comfort sensor $70_1$ is coupled within network $80_1$, and comfort sensor $72_1$ is coupled within network $80_2$. As described earlier herein, addressing for comfort sensors may be carried out in a human user-friendly approach by assigning address $C_1$ as HEX 60+1, which is decimal 96+1. Thus address $C_1$ could be recognizable by a human user as 97 (i.e., 96+1).

For purposes of explanation herein, comfort sensor $72_1$ may have an address $C_1$, which may be recognized by master control unit 52 as being associated with modular control unit $58_1$. Comfort sensor $72_2$ may have an address $C_2$, which may be recognized by master control unit 52 as being associated with modular control unit $58_2$. Comfort sensor $72_x$ may have an address $C_b$ ($C_b$=96+b), which may be recognized by master control unit 52 as being associated with modular control unit $58_m$. Hence, in exemplary network 50 the address for modular control unit $58_m$ may be expressed as [r+(m-b)].

Zone link unit $54_3$ is coupled with and controls operation of a network $80_3$ of communicating units. Communicating units coupled in network $80_3$ include modular control units $60_1$, $60_2$, $60_m$ and include comfort sensors $74_1$, $74_2$, $74_x$. By way of example and not by way of limitation, each modular control unit $60_1$, $60_2$, $60_m$ may be coupled and configured for controlling environmental conditioning of a respective region, zone or space. By way of further example and not by way of limitation comfort sensors $74_1$, $74_2$, $74_x$ may be coupled and configured for sensing respective parameters associated with respective regions, zones or spaces. Network 50 is configured with comfort sensor $74_1$ coupled for sensing parameters within a zone controlled by modular control unit $60_1$; with comfort sensor $74_2$ coupled for sensing parameters within a zone controlled by modular control unit $60_2$; and with comfort sensor $74_x$ coupled for sensing parameters within a zone controlled by modular control unit $60_m$. Addresses for various communicating units in network $80_3$ are indicated in brackets adjacent to respective communicating units. Address treating unit $55_3$ mathematically treats addresses by adding a value "2r" to addresses of communicating units in network $80_3$. Thus, modular control unit $60_1$ may have an address "2r+1", modular control unit $60_2$ may have an address "2r+2" and modular control unit $60_m$ may have an address "2r+(m-c)". The term "c" is related to addresses assigned to comfort sensor units in network $80_3$. As described earlier herein, comfort sensors are assigned addresses outside the range of addresses available for assignment to modular control units $54_1$, $54_2$, $54_3$, $54_4$, $54_p$ and modular control units $56_m$, $58_m$, $60_m$, $62_m$, $64_m$. Network 50 may be designed to avail master control unit 52 with an ability to recognize addresses outside the range of addresses provided for assignment to modular control units $54_1$, $54_2$, $54_3$, $54_4$, $54_p$ and modular control units $56_m$, $58_m$, $60_m$, $62_m$, $64_m$. It is such an arrangement that is accommodated by network 50 (FIG. 3).

By way of example and not by way of limitation, comfort sensor $74_1$ may have an address $C_1$, which may be recognized by master control unit 52 as being associated with modular control unit $60_1$. Address $C_1$ for comfort sensor $74_1$ is distinguishable by master control unit 52 from address $C_1$ for comfort sensors $70_1$, $72_1$ because master control unit 52 can recognize that comfort sensor $74_1$ is coupled within network $80_3$, and comfort sensors $70_1$, $72_1$, are coupled within networks $80_1$, $80_2$. As described earlier herein, addressing for comfort sensors may be carried out in a human user-friendly approach by assigning address $C_1$ as HEX 60+1, which is decimal 96+1. Thus address $C_1$ could be recognizable by a human user as 97 (i.e., 96+1).

For purposes of explanation herein, comfort sensor $74_1$ may have an address $C_1$, which may be recognized by master control unit 52 as being associated with modular control unit $60_1$. Comfort sensor $74_2$ may have an address $C_2$, which may be recognized by master control unit 52 as being associated with modular control unit $60_2$. Comfort sensor $74_x$ may have an address $C_c$ ($C_c$=96+c), which may be recognized by master control unit 52 as being associated with modular control unit $60_m$. Hence, in exemplary network 50 the address for modular control unit $60_m$ may be expressed as [2r+(m-c)].

Zone link unit $54_4$ is coupled with and controls operation of a network $80_4$ of communicating units. Communicating units coupled in network $80_4$ include modular control units $62_1$, $62_2$, $62_m$ and include comfort sensors $76_1$, $76_2$, $76_x$. By way of example and not by way of limitation, each modular control unit $62_1$, $62_2$, $62_m$ may be coupled and configured for controlling environmental conditioning of a respective region, zone or space. By way of further example and not by way of limitation comfort sensors $76_1$, $76_2$, $76_x$ may be coupled and configured for sensing respective parameters associated with respective regions, zones or spaces. Network 50 is configured with comfort sensor $76_1$ coupled for sensing parameters within a zone controlled by modular control unit $62_1$; with comfort sensor $76_2$ coupled for sensing parameters within a zone controlled by modular control unit $62_2$; and with comfort sensor $76_x$ coupled for sensing parameters within a zone controlled by modular control unit $62_m$. Addresses for various communicating units in network $80_4$ are indicated in brackets adjacent to respective communicating units. Address treating unit $55_4$ mathematically treats addresses by adding a value "3r" to addresses of communicating units in network $80_4$. Thus, modular control unit $62_1$ may have an address "3r+1", modular control unit $62_2$ may have an address "3r+2" and modular control unit $62_m$ may have an address "3r+(m-d)". The term "d" is related to addresses assigned to comfort sensor units in network $80_4$. As described earlier herein, comfort sensors are assigned addresses outside the range of addresses available for assignment to modular control units $54_1$, $54_2$, $54_3$, $54_4$, $54_p$ and modular control units $56_m$, $58_m$, $60_m$, $62_m$, $64_m$. Network 50 may be designed to avail master control unit 52 with an ability to recognize addresses outside the range of addresses provided for assignment to modular control units $54_1$, $54_2$, $54_3$, $54_4$, $54_p$ and modular control units $56_m$, $58_m$, $60_m$, $62_m$, $64_m$. It is such an arrangement that is accommodated by network 50 (FIG. 3).

By way of example and not by way of limitation, comfort sensor $76_1$ may have an address $C_1$, which may be recognized by master control unit 52 as being associated with modular control unit $62_1$. Address $C_1$ for comfort sensor $76_1$ is distinguishable by master control unit 52 from address $C_1$ for comfort sensors $70_1$, $72_1$, $74_1$ because master control unit 52 can recognize that comfort sensor $76_1$ is coupled within network $80_4$, and comfort sensors $70_1$, $72_1$, $74_1$ are coupled within networks $80_1$, $80_2$, $80_3$. As described earlier herein, addressing for comfort sensors may be carried out in a human user-friendly approach by assigning address $C_1$ as HEX 60+1, which is decimal 96+1. Thus address $C_1$ could be recognizable by a human user as 97 (i.e., 96+1).

For purposes of explanation herein, comfort sensor $76_1$ may have an address $C_1$, which may be recognized by master control unit 52 as being associated with modular control unit $62_1$. Comfort sensor $76_2$ may have an address $C_2$, which may be recognized by master control unit 52 as being associated with modular control unit $62_2$. Comfort sensor $76_x$ may have an address $C_d$ ($C_d$=96+d), which may be recognized by master control unit 52 as being associated with modular control unit $62_m$. Hence, in exemplary network 50 the address for modular control unit $62_m$ may be expressed as [3r+(m-d)].

Zone link unit $54_p$ is coupled with and controls operation of a network $80_p$ of communicating units. Communicating units coupled in network $80_p$ include modular control units $64_1$, $64_2$, $64_m$ and include comfort sensors $78_1$, $78_2$, $78_x$. By way of example and not by way of limitation, each modular control unit $64_1$, $64_2$, $64_m$ may be coupled and configured for controlling environmental conditioning of a respective region, zone or space. By way of further example and not by way of limitation comfort sensors $78_1$, $78_2$, $78_x$ may be coupled and configured for sensing respective parameters associated with respective regions, zones or spaces. Network 50 is configured with comfort sensor $78_1$ coupled for sensing parameters within a zone controlled by modular control unit $64_1$; with comfort sensor $78_2$ coupled for sensing parameters within a zone controlled by modular control unit $64_2$; and with comfort sensor $78_x$ coupled for sensing parameters within a zone controlled by modular control unit $64_m$. Addresses for various communicating units in network $80_p$ are indicated in brackets adjacent to respective communicating units. Address treating unit $55_p$ mathematically treats addresses by adding a value "pr" to addresses of communicating units in network $80_p$. Thus, modular control unit $64_1$ may have an address "pr+1", modular control unit $64_2$ may have an address "pr+2" and modular control unit $64_m$ may have an address "pr+(m-e)". The term "e" is related to addresses assigned to comfort sensor units in network $80_p$. As described earlier herein, comfort sensors are assigned addresses outside the range of addresses available for assignment to modular control units $54_1$, $54_2$, $54_3$, $54_4$, $54_p$ and modular control units $56_m$, $58_m$, $60_m$, $62_m$, $64_m$. Network 50 may be designed to avail master control unit 52 with an ability to recognize addresses outside the range of addresses provided for assignment to modular control units $54_1$, $54_2$, $54_3$, $54_4$, $54_p$ and modular control units $56_m$, $58_m$, $60_m$, $62_m$, $64_m$. It is such an arrangement that is accommodated by network 50 (FIG. 3). By way of example and not by way of limitation, comfort sensor $78_1$ may have an address $C_1$, which may be recognized by master control unit 52 as being associated with modular control unit 641. Address $C_1$ for comfort sensor $78_1$ is distinguishable by master control unit 52 from address $C_1$ for comfort sensors $70_1$, $72_1$, $74_1$, $76_1$ because master control unit 52 can recognize that comfort sensor $78_1$ is coupled within network $80_p$, and comfort sensors $70_1$, $72_1$, $74_1$, $76_1$ are coupled within networks $80_1$, $80_2$, $80_3$, $80_4$. As described earlier herein, addressing for comfort sensors may be carried out in a human user-friendly approach by assigning address $C_1$ as HEX 60+1, which is decimal 96+1. Thus address $C_1$ could be recognizable by a human user as 97 (i.e., 96+1).

For purposes of explanation herein, comfort sensor $78_1$ may have an address $C_1$, which may be recognized by master control unit 52 as being associated with modular control unit $64_1$. Comfort sensor $78_2$ may have an address $C_2$, which may be recognized by master control unit 52 as being associated with modular control unit $64_2$. Comfort sensor $78_x$ may have an address $C_e$ ($C_e$=96+e), which may be recognized by master control unit 52 as being associated with modular control unit $64_m$. Hence, in exemplary network 50 the address for modular control unit $64_m$ may be expressed as [pr+(m-e)].

FIG. 4 is a flow chart illustrating the method of the present invention. In FIG. 4, a method 100 for treating addresses employed in an environmental control network begins at a START locus 102. The network includes at least one control unit communicating with a plurality of components. Each respective component of the plurality of components has an address selected from a predetermined number of address values. Method 100 continues by providing an address extending unit coupled with the at least one control unit and with at least one coupled component of the plurality of components, as indicated by a block 104. Method 100 continues by operating the address extending unit to treat each address for each coupled component to establish a respective unique treated address for each coupled component, as indicated by a block 106. Method 100 continues by operating the at least one control unit to identify each respective component by its respective treated address, as indicated by a block 108. Method 100 terminates at an END locus 110.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for treating addresses employed in an environmental control network, comprising:
a control unit configured to communicate with:
at least one other control unit over said network; and
a master control unit; and
an address extending unit coupled to said control unit and configured to communicate with a plurality of components including modular control units and comfort sensors for sensing parameters within a zone controlled by said modular control units, each modular control unit having an address selected from a predetermined number of address values, said address extending unit configured to treat each of said selected addresses to establish a unique treated address for each of said plurality of components so that said master control unit can identify each said component by its said treated address.

2. An apparatus for treating addresses employed in an environmental control network as recited in claim 1 wherein said treating employs mathematical manipulation of at least one said selected address for said plurality of components.

3. An apparatus for treating addresses employed in an environmental control network as recited in claim 1 wherein said treating employs signal manipulation of at least one said selected address for said plurality of components.

4. An apparatus for treating addresses employed in an enviromental control network as recited in claim 2 wherein said treating further employs signal manipulation of at least one said selected address for said plurality of components.

5. An apparatus for treating addresses employed in an environmental control network as recited in claim 2 wherein said mathematical manipulation effects multiplication of at least one said selected address for said plurality of components by a factor.

6. An apparatus for treating addresses employed in an environmental control network as recited in claim 2 wherein said mathematical manipulation effects addition of a value to at least one said selected address for said plurality of components.

7. An apparatus for treating addresses employed in an environmental control network as recited in claim 6 wherein said value is at least equal with said predetermined number.

8. An apparatus assisting address assignment in an environmental control network, comprising:
   a control unit configured to communicate with:
      at least one other control unit over said network; and
      a master control unit; and
   an address extending unit coupled to said control unit and configured to communicate with a plurality of components including modular control units and comfort sensors for sensing parameters within a zone controlled said modular control units, each modular control unit having an address selected from a predetermined number of address values, said address extending unit configured to treat each of said selected addresses to establish a unique treated address for each of said plurality of components so that said master control unit can identify each said component by its said treated address, wherein said treating employs mathematical manipulation of said selected address.

9. An apparatus assisting address assignment in an environmental control network as recited in claim 8 wherein said treating employs signal manipulation of at least one said selected address for said plurality of components.

10. An apparatus assisting address assignment in an environmental control network as recited in claim 8 wherein said mathematical manipulation effects multiplication of each said selected address by a factor.

11. An apparatus for treating addresses employed in an environmental control network as recited in claim 8 wherein said mathematical manipulation effects addition of a value to least one said selected address for said plurality of components.

12. An apparatus for treating addresses employed in an environmental control network as recited in claim 8 wherein said value is at least equal with said predetermined number.

13. A method for treating addresses employed in an environmental control network the method comprising the steps of:
   (a) providing an address extending unit coupled with a control unit and with a plurality of components including modular control units and comfort sensors for sensing parameters within a zone controlled said modular control units, each of said modular control unit having an address selected from a predetermined number of address values, wherein said address extending unit communicates with said plurality of components and said control unit communicates with at least one other control unit and a master control unit;
   (b) operating said address extending unit to treat each said selected address for said plurality of components to establish a unique treated address for each of said plurality of components;
   (c) operating said master control unit to identify each said component by its said treated address.

14. A method for treating addresses employed in an environmental control network as recited in claim 13 wherein said treating employs mathematical manipulation of at least one said selected address for said plurality of components.

15. A method for treating addresses employed in an environmental control network as recited in claim 13 wherein said treating employs signal manipulation of at least one said selected address for said plurality of components.

16. A method for treating addresses employed in an environmental control network as recited in claim 14 wherein said treating further employs signal manipulation of at least one said selected address for said plurality of components.

17. A method for treating addresses employed in an environmental control network as recited in claim 14 wherein said mathematical manipulation effects multiplication of at least one said selected respective address for said plurality of components by a factor.

18. A method for treating addresses employed in an environmental control network as recited in claim 14 wherein said mathematical manipulation effects addition of a value to at least one said selected address for said plurality of components.

19. A method for treating addresses employed in an environmental control network as recited in claim 18 wherein said value is at least equal with said predetermined number.

20. A method for treating addresses employed in an environmental control network as recited in claim 16 wherein said mathematical manipulation effects addition of a value to at least one said selected address for said plurality of components.

* * * * *